J. G. BLUNT.
GREASE CUP PLUG.
APPLICATION FILED OCT. 8, 1919.
1,341,411. Patented May 25, 1920.
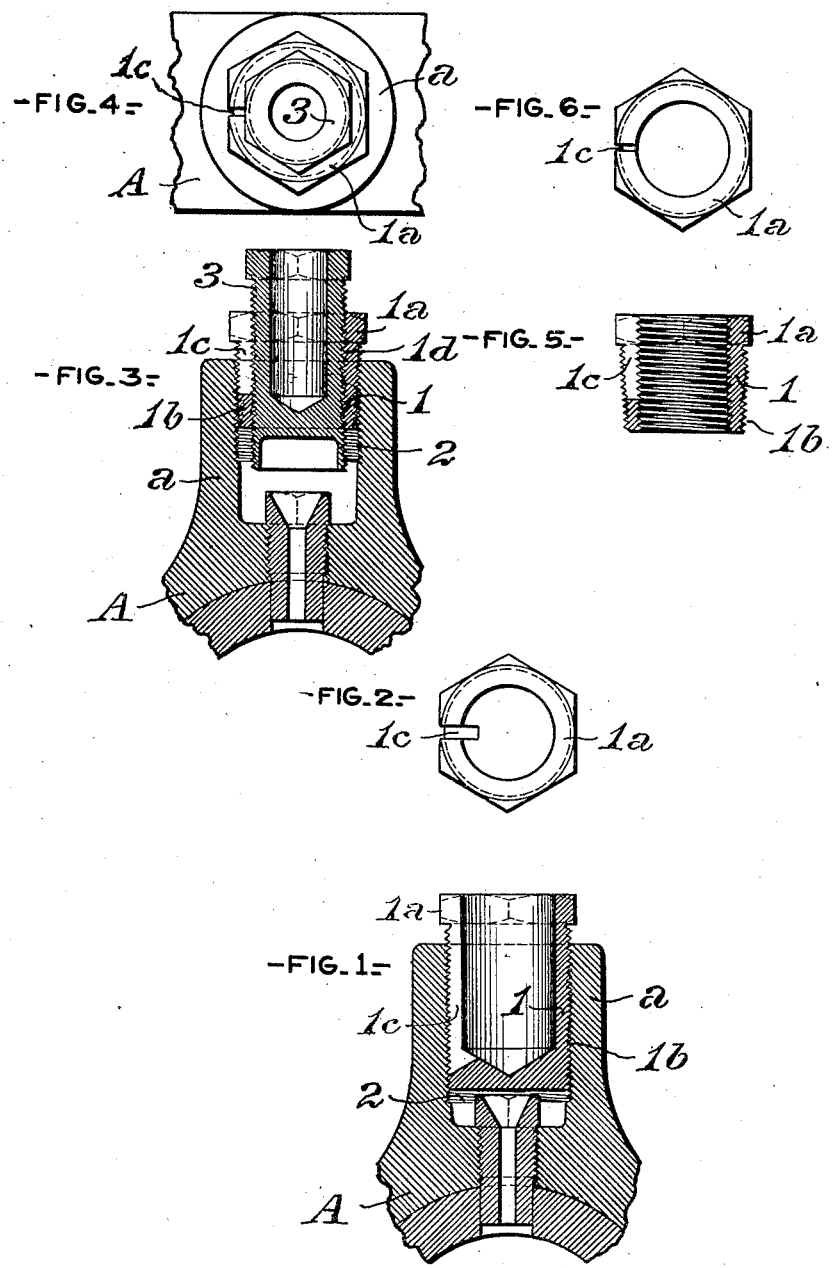

UNITED STATES PATENT OFFICE.

JAMES G. BLUNT, OF SCHENECTADY, NEW YORK.

GREASE-CUP PLUG.

1,341,411. Specification of Letters Patent. Patented May 25, 1920.

Application filed October 8, 1919. Serial No. 329,358.

*To all whom it may concern:*

Be it known that I, JAMES G. BLUNT, of Schenectady, in the county of Schenectady and State of New York, have invented a certain new and useful Improvement in Grease-Cup Plugs, of which improvement the following is a specification.

My invention relates to means for effecting the closure of lubricating cups, more particularly grease cups of the type commonly applied on locomotive side rods, and its object is to provide an appliance which can be readily attached to, and detached from, the member in connection with which it operates, and which, when in operative position, will be securely held therein, as against accidental or undesired displacement.

The improvement claimed is hereinafter fully set forth.

In the accompanying drawings: Figure 1 is a vertical central section through a locomotive side rod grease cup, illustrating an embodiment of my invention; Fig. 2, a plan view of the plug; Fig. 3, a similar section to Fig. 1, illustrating a structural modification; Fig. 4, a plan view of the same; Fig. 5, a vertical central section through the main plug of Fig. 3; and, Fig. 6, a plan view of the same.

Lubricant cups of the type to which my invention relates are ordinarily in the form of a cylindrically bored chamber for the reception of the lubricant, which chamber is threaded, with a straight thread, for the major part of its length, and is closed by a similarly threaded plug, which is inserted and screwed down, to force out the lubricant through a bottom delivery passage, open to the surface of the bearing which is to be lubricated. In order to prevent the plug from accidentally backing out of the lubricant chamber, a lock nut is sometimes threaded on it, and drawn up to a bearing on the top of the cup, after the plug has been placed in position. This means of locking the plug has been found to be inefficient, and to fail to positively prevent the backing out of the plug, particularly in locomotive service, where it is exposed to constant jars and vibrations.

My invention eliminates the objection above stated, by insuring the retention of the plug in normal position, under all conditions of operation, without interfering with its capacity of prompt and easy attachment to, and detachment from, the grease cup.

In the practice of my invention, which is herein exemplified as applied in connection with the grease cup, $a$, of a locomotive side rod, A, referring first to Figs. 1 and 2, I provide a plug, 1, which is tubular or in the form of a sleeve or bushing, and is provided, at its top, with a squared head, $1^a$, for the application of a wrench in attaching it to, and detaching it from, the cup. An external thread, $1^b$, which is continuously inwardly tapered or reduced in diameter, from the head to the bottom of the plug, as, say, in ordinary practice, in the ratio of three-eighths of an inch to twelve, or thereabout, is cut upon the plug. The thread, $1^b$, approximately fits an internal thread, 2, cut in the cup, $a$, which latter thread may be either straight or of less taper than the thread, $1^b$. The plug, 1, is split or divided by a longitudinal slot, $1^c$, which is cut on one side of its axis, and extends from its top to or near its bottom, being preferably, as shown, stopped a short distance above the bottom, to prevent grease passing out through the slot.

In connecting the plug to the grease cup, it is screwed thereinto until the difference between the taper of its external thread and that of the internal thread of the cup causes it to be compressed, its capacity of compression being provided by the longitudinal slot, $1^c$, which permits its diameter to be decreased, thereby tightly engaging it with the cup and securely holding it therein.

In the structural modification shown in Figs. 3 to 6, inclusive, the construction of the plug, 1, and its relation to the internal thread of the grease cup, are similar, in all essential particulars, to the corresponding features of the appliance before described. In this instance, however, an internal straight screw thread, $1^d$, is cut in the plug, 1, and a supplemental plug, 3, having an external thread, $3^a$, which engages the thread, $1^d$, is provided.

In applying this form of the invention, the main plug, 1, is first screwed lightly into the cup, the relation of the threads, $1^b$ and 2, being such that the plug, 1, is not appreciably compressed or its slot, $1^c$, narrowed in the operation. The supplemental plug, 3, is then screwed into the plug, 1, and the plug, 1, is screwed farther into the cup, until the difference between the threads, 1ᵇ and 2, causes it to be compressed as before described.

I claim as my invention and desire to secure by Letters Patent:

1. The combination of a lubricating cup, having an internally screw threaded lubricant chamber; and a longitudinally split plug, having an external screw thread, inwardly tapering from the top to the bottom of the plug, and engaging the thread of the lubricant chamber.

2. The combination of a lubricating cup, the lubricant chamber of which is internally screw threaded; and a longitudinally split tubular plug having an external screw thread downwardly diminishing in diameter, the inclination of said thread to its axis being greater than that of the thread of the lubricant chamber.

3. The combination of a lubricating cup, the lubricant chamber of which has cut upon it an internal screw thread; and a tubular plug having an external screw thread adapted to engage the thread of the lubricant chamber, and a longitudinal slot extending from its top to or near its bottom, the threads of the cup and plug being inclined to their common axis at different angles, respectively.

4. The combination of a lubricating cup, the lubricant chamber of which has cut upon it an internal screw thread; a tubular plug having an external screw thread adapted to engage the thread of the lubricant chamber, and a longitudinal slot extending from its top to or near its bottom, the threads of the cup and plug being inclined to their common axis at different angles, respectively; and a supplemental externally threaded plug engaging an internal thread on the first specified plug.

JAMES G. BLUNT.

Witnesses:
R. F. HALL,
J. HOWARD WAGAR.